United States Patent
Yeh (10) Patent No.: US 8,651,409 B2
(45) Date of Patent: Feb. 18, 2014

(54) BRAKE-ADJUSTING ASSEMBLY FOR A FISHING REEL

(76) Inventor: Shih-Yuan Yeh, Taichung (TW)

( * ) Notice: Subject to any disclaimer, the term of this patent is extended or adjusted under 35 U.S.C. 154(b) by 77 days.

(21) Appl. No.: 13/546,897

(22) Filed: Jul. 11, 2012

(65) Prior Publication Data

US 2014/0014756 A1  Jan. 16, 2014

(51) Int. Cl.
*A01K 89/01* (2006.01)
(52) U.S. Cl.
USPC .............................. 242/246; 242/302; 242/303
(58) Field of Classification Search
USPC ................. 242/243, 244, 245, 246, 302, 303
See application file for complete search history.

(56) References Cited

U.S. PATENT DOCUMENTS

| | | | | |
|---|---|---|---|---|
| 3,682,411 A * | 8/1972 | Dumbauld | | 242/246 |
| 4,951,897 A * | 8/1990 | Takeuchi | | 242/246 |
| 5,007,602 A * | 4/1991 | Carlsson | | 242/246 |
| 5,149,008 A * | 9/1992 | Oi | | 242/246 |
| 5,603,465 A * | 2/1997 | Henriksson | | 242/246 |
| 5,607,114 A * | 3/1997 | Henriksson | | 242/244 |
| 5,988,547 A * | 11/1999 | Koelewyn | | 242/246 |
| 6,318,655 B1 * | 11/2001 | Henze | | 242/244 |
| 6,533,203 B2 * | 3/2003 | Hitomi et al. | | 242/322 |
| 6,598,819 B2 * | 7/2003 | Furomoto | | 242/319 |
| 8,485,461 B2 * | 7/2013 | Saito | | 242/322 |

* cited by examiner

*Primary Examiner* — Emmanuel M Marcelo
(74) *Attorney, Agent, or Firm* — Rahman LLC (57) ABSTRACT

A brake-adjusting assembly for a fishing reel with a spool and has a first brake-adjusting device and a second brake-adjusting device. The first brake-adjusting device is mounted around a spindle of the spool and has a clutch cam and a lever mount. The clutch cam has a main plate body, a mounting tube, a spring and an abutting base formed on and protruding from the main plate body. The lever mount abuts with the clutch cam and has two pushing blocks, a mounting recess and at least one lever. The second brake-adjusting device is connected to the first brake-adjusting device and the spindle and has a connecting mount, a threaded tube and an adjusting switch. The connecting mount is mounted in the mounting recess. The threaded tube is mounted in the connecting mount to screw with the spindle. The adjusting switch is securely connected to the connecting mount.

7 Claims, 8 Drawing Sheets

BRAKE-ADJUSTING ASSEMBLY FOR A FISHING REEL

BACKGROUND OF THE INVENTION

1. Field of the Invention

The present invention relates to a brake-adjusting assembly, and more particularly relates to a brake-adjusting assembly for a fishing reel to be operated conveniently, to provide a two-stage adjusting effect to the fishing reel and to improve the practicality of the fishing reel.

2. Description of Related Art

Fishing is a very popular recreation and continuing improvements in the equipment used for it ensure its longevity. A conventional fishing reel is a necessary tool for fishing and has body, a spool, a handle and a clutch. The spool is rotatably mounted in the body to wind a fishing line on the spool. The handle is rotatably mounted on an end of the body and selectively connects to and rotates the spool to roll the fishing line. The clutch is mounted in the body between the spool and the handle and selectively connects the spool and the handle by a switch of the clutch. A user can turn the switch to control the on-off status between the spool and the handle.

Furthermore, the conventional fishing reel has a brake device mounted on a front end or a rear end of the spool to selectively abut against the clutch to provide a deceleration effect to the conventional fishing reel. In fishing, a hand of a user grips a fishing rod that is securely connected to the body of the conventional fishing reel and the other hand of the user grips the handle of the conventional fishing reel. When catching fish, the user needs to use the brake device to adjust the friction force of the spool to provide an appropriate pulling force to the fish, for example, to avoid a large, powerful fish suddenly exerting too much force on the line. Hence, the user may have to adjust the brake device whilst playing a fish. However, the hands of the user respectively grip the fishing rod and the handle, so the user needs to separate one of the hands from the fishing rod or the handle to adjust the brake device. Then, the user cannot securely grip the fishing rod or the handle and cannot adjust the brake device conveniently to provide an immediate friction force to the spool according to the user's need. Furthermore, the brake device of the conventional fishing reel has a specific size and structure and cannot be assembled in different fishing reels and this will limit the practicality of the brake device and will increase the cost of maintaining and replacing the conventional fishing reel.

Therefore, the present invention provides a brake-adjusting assembly for a fishing reel to mitigate or obviate the aforementioned problems.

SUMMARY OF THE INVENTION

The main objective of the present invention is to provide a brake-adjusting assembly for a fishing reel to be operated conveniently, to provide a two-stage adjusting effect to the fishing reel and to improve the practicality of the fishing reel.

The brake-adjusting assembly for a fishing reel with a spool in accordance with the present invention has a first brake-adjusting device and a second brake-adjusting device. The first brake-adjusting device is mounted around a spindle of the spool in a mounting jacket of the spool and has a clutch cam and a lever mount. The clutch cam has a main plate body, a mounting tube, a spring and an abutting base. The abutting base is formed on and protrudes from the main plate body and has two wedge blocks. The lever mount is rotatably mounted around the spindle, abuts with the clutch cam and has two pushing blocks, a mounting recess and at least one lever. The second brake-adjusting device is connected to the first brake-adjusting device and the spindle and has a connecting mount, a threaded tube and an adjusting switch. The connecting mount is mounted in the mounting recess and has a through hole. The threaded tube is mounted in the through hole and is screwed with the spindle. The adjusting switch is securely connected to the connecting mount and has a driving tube securely mounted around the threaded tube.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
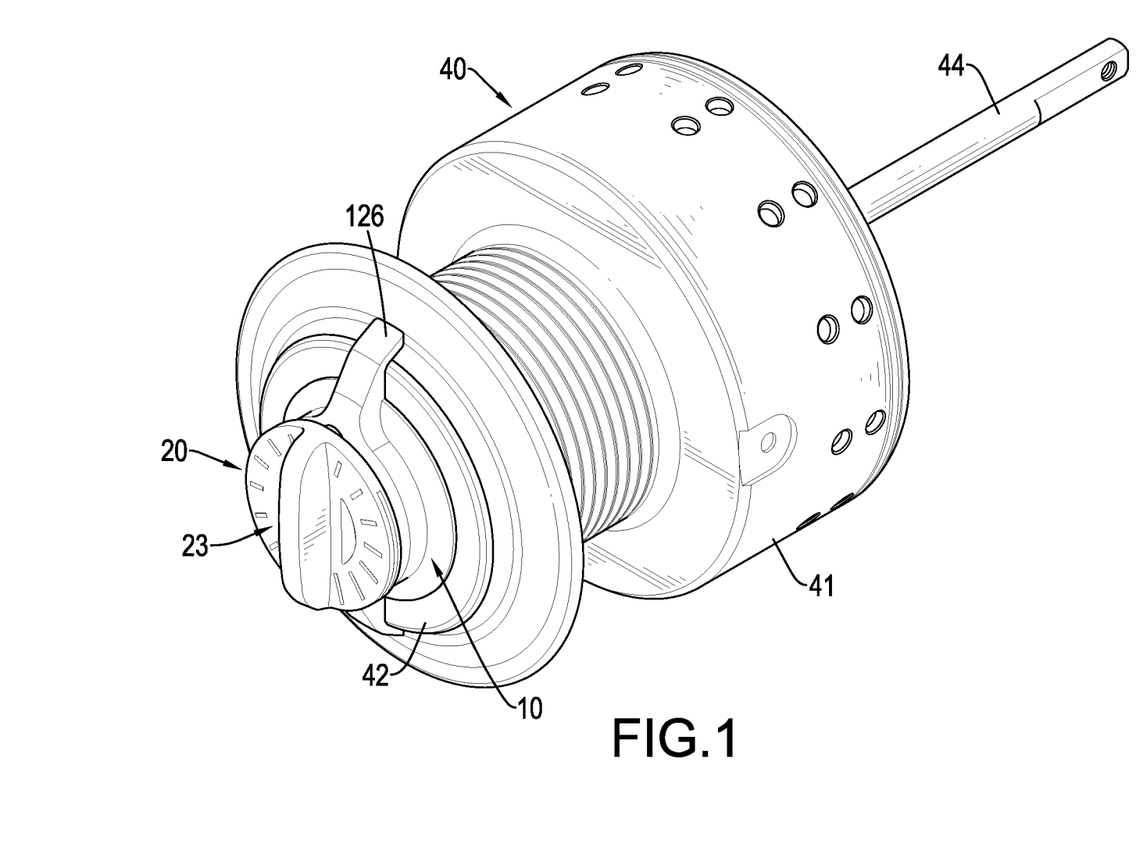
FIG. 1 is a perspective view of a fishing reel with a brake-adjusting assembly in accordance with the present invention.
Figure 2:
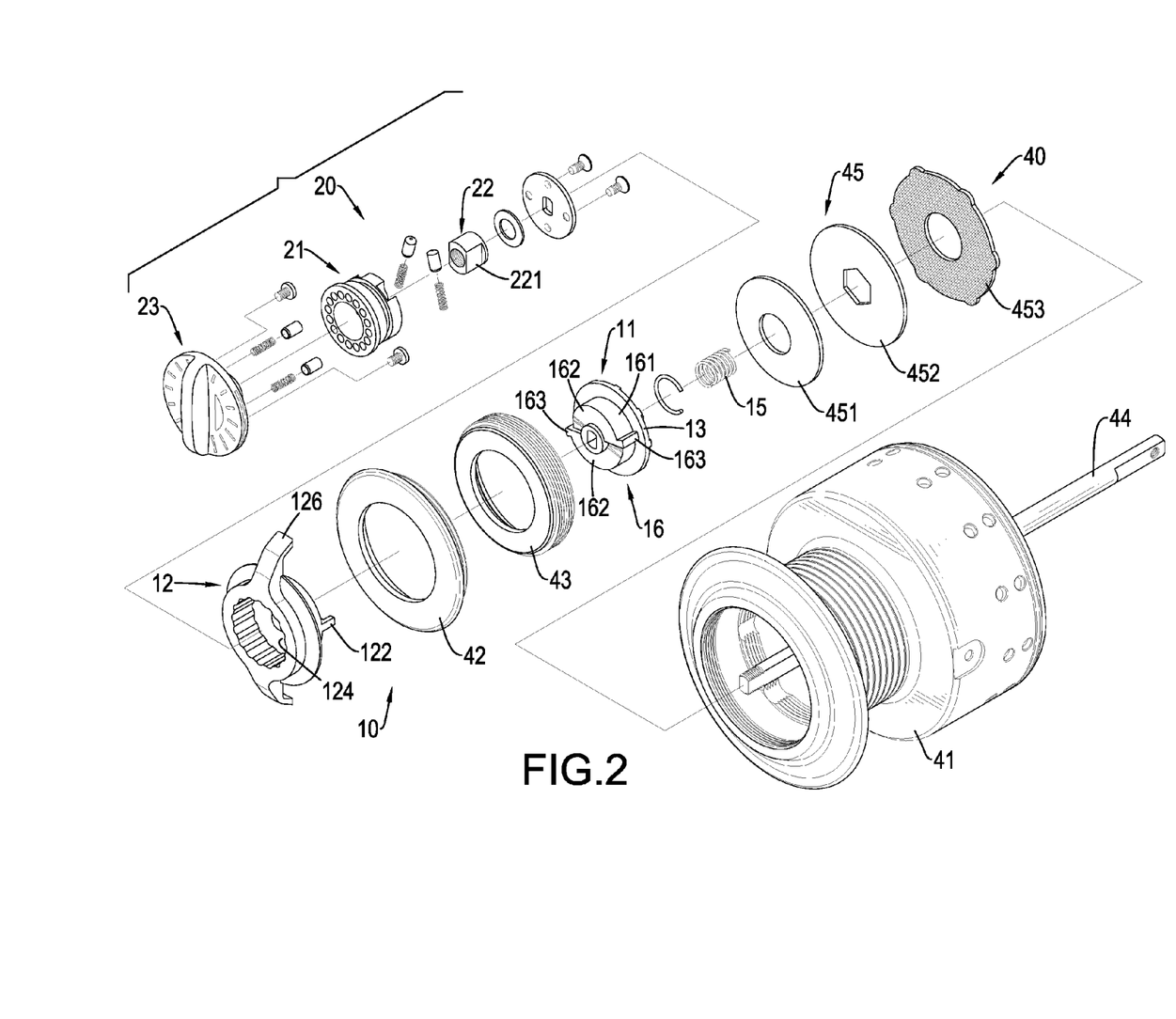
FIG. 2 is an exploded perspective view of the fishing reel with the brake-adjusting assembly in FIG. 1.

With reference to FIGS. 1 and 2, a brake-adjusting assembly in accordance with the present invention is mounted in a spool 40 of a fishing reel, the spool 40 has a mounting jacket 41, a cover 42, a holding ring 43, a spindle 44 and a brake 45. The mounting jacket 41 is hollow and has a front end. The cover 42 is detachably connected to the front end of the mounting jacket 41. The holding ring 43 is mounted in the mounting jacket 41 and faces the cover 42. The spindle 44 is mounted in the mounting jacket 41, extends through the cover 42 and the holding ring 43 and has a connecting end extending out of the cover 42. The brake 45 is mounted around the spindle 44 in the mounting jacket 41, faces the holding ring 43 and has an abutting disc 451, a brake disk 452 and a friction disk 453. The operation and the structural relationship of the spool 40 of the fishing reel may be prior arts and description is omitted. The brake-adjusting assembly in accordance with the present invention is mounted in the spool 40 of the fishing reel and comprises a first brake-adjusting device 10 and a second brake-adjusting device 20.

The first brake-adjusting device 10 is mounted around the spindle 44 of the spool 40 in the mounting jacket 41 and has a clutch cam 11 and a lever mount 12.

Figure 3:
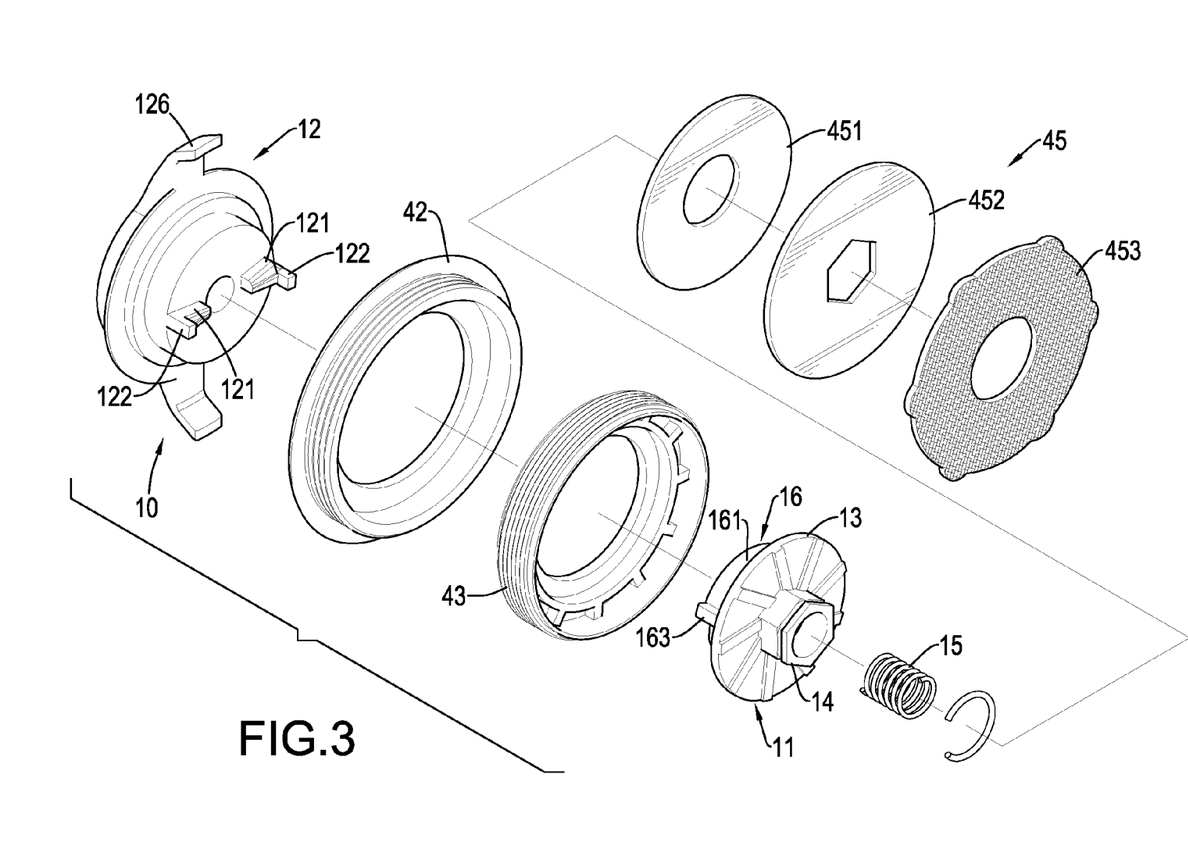
FIG. 3 is an enlarged and exploded perspective view of the fishing reel with the brake-adjusting assembly in FIG. 2.
Figure 5:
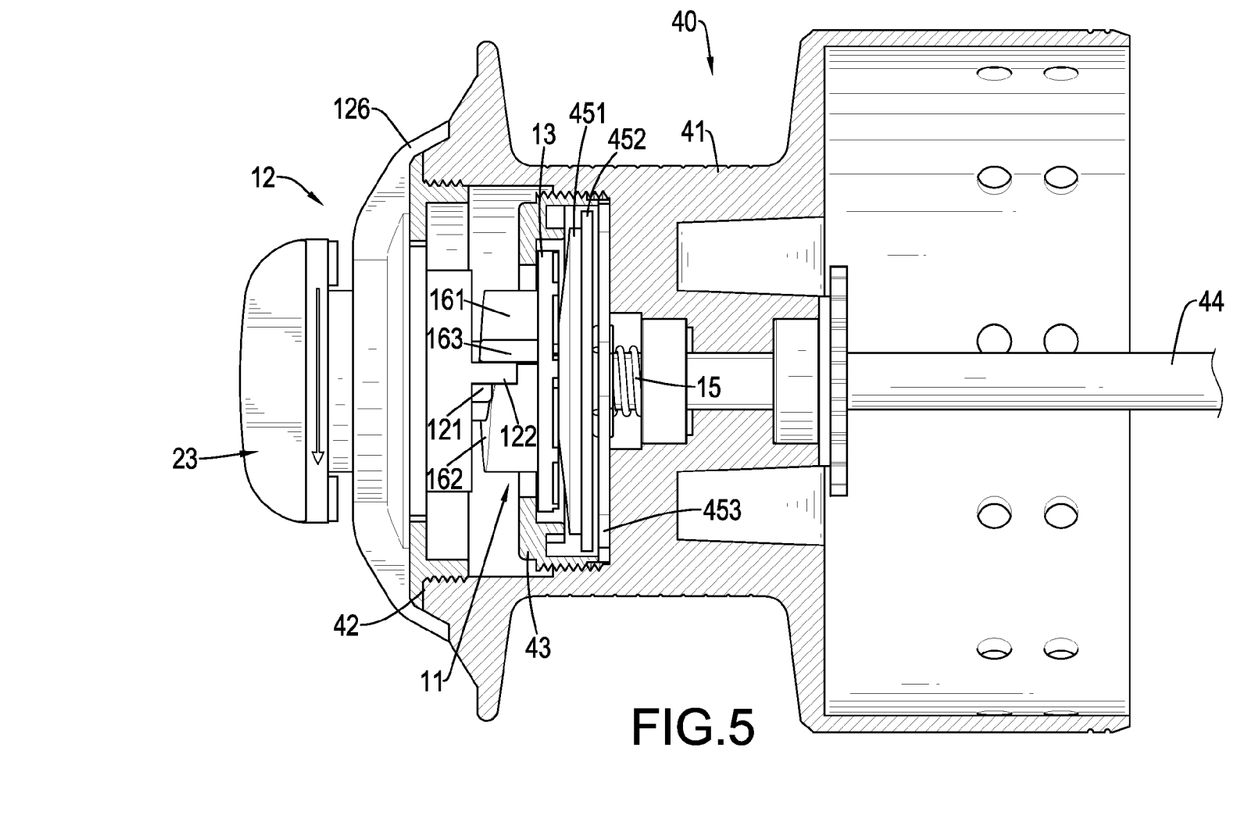
FIG. 5 is a side view in partial section of fishing reel with the brake-adjusting assembly in FIG. 1.
Figure 6:
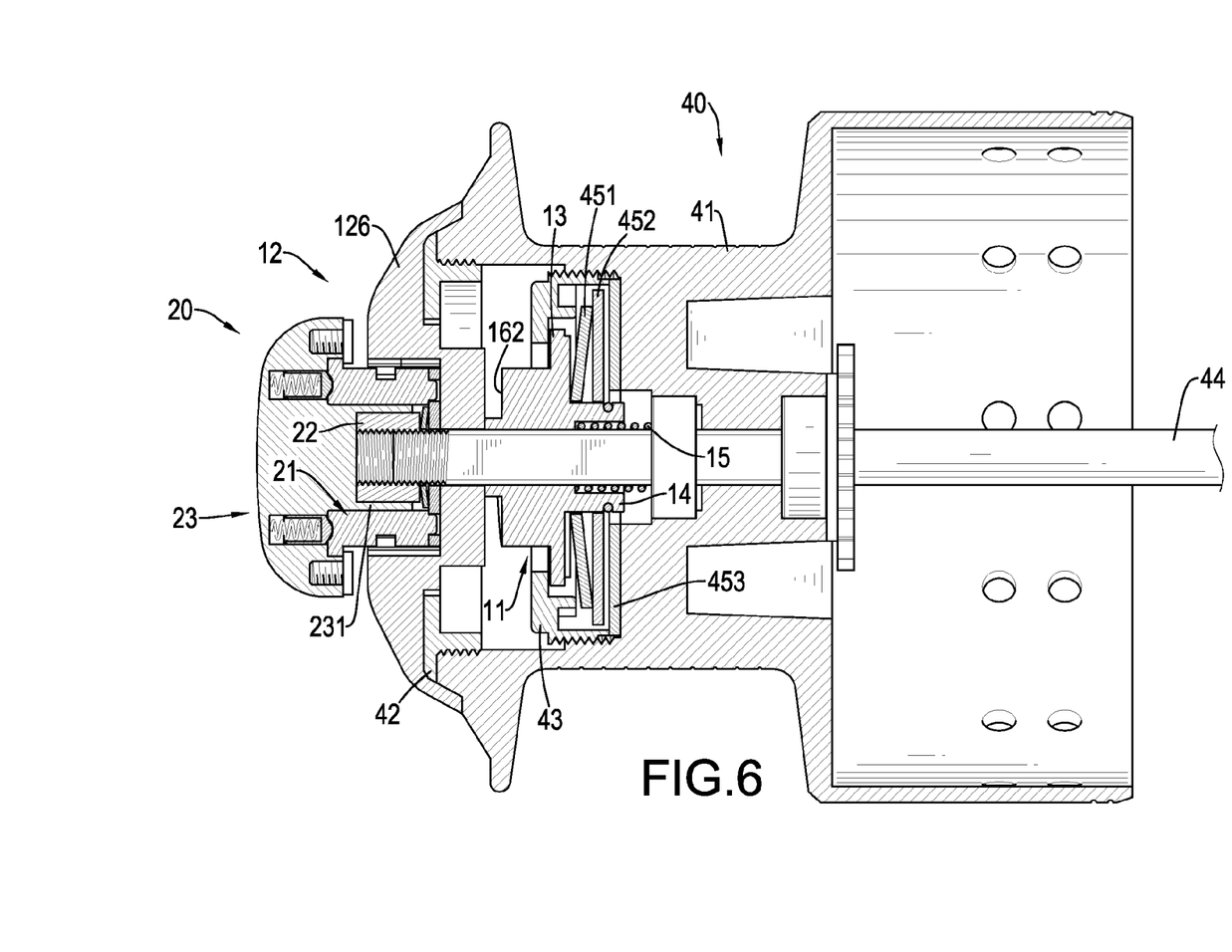
FIG. 6 is another side view in partial section of fishing reel with the brake-adjusting assembly in FIG. 1.

With reference to FIGS. 3, 5 and 6, the clutch cam 11 is movably forward or backward mounted around the spindle 44 between the holding ring 43 and the brake 45 and has a main plate body 13, a mounting tube 14, a spring 15 and an abutting base 16.

The main plate body 13 is mounted around the spindle 44 between the holding ring 43 and the brake 45, selectively abuts with the holding ring 43 and the brake 45 and has a front side, a rear side and a diameter. The mounting tube 14 is formed on and protrudes from the rear side of the main plate body 13, is mounted around the spindle 44 and extends through the abutting disc 451, the brake disk 452 and the friction disk 453 of the brake 45. The spring 15 is mounted around the spindle 44, is mounted in the mounting tube 14 and abuts with the main plate body 13. The abutting base 16 is formed on and protrudes from the front side of the main plate body 13, extends through the holding ring 43 and faces the cover 42. The abutting base 16 has a diameter smaller than the diameter of the main plate body 13 and is composed by two semicircular wedge blocks 161. Each wedge block 161 has a front side, a periphery, an abutting face 162 and a limiting protrusion 163. The front side of the wedge block 161 faces the cover 42. The abutting face 162 is obliquely formed on the front side of the wedge block 161. The limiting protrusion 163 is longitudinally formed on and protrudes from the periphery of the wedge block 161.

With reference to FIGS. 2, 3 and 5, the lever mount 12 is rotatably mounted around the spindle 44, abuts with the clutch cam 11 and extends out of the mounting jacket 41 via the cover 42. The lever mount 12 has a rear side, a front side, a periphery, two pushing blocks 121, two positioning protrusions 122, a mounting recess 124 and at least one lever 126. The rear side of the lever mount 12 faces the abutting faces 162 of the wedge blocks 161. The front side of the lever mount 12 extends out of the mounting jacket 41 via the cover 42. The pushing blocks 121 are formed on and protrude from the rear side of the lever mount 12 and respectively abut with the abutting faces 162 of the wedge blocks 161, and each pushing block 121 has an outer surface. The positioning protrusions 122 are respectively and longitudinally formed on and protrude from the outer surfaces of the pushing blocks 121 and respectively and selectively abut with the limiting protrusions 163 of the wedge blocks 161. The mounting recess 124 is formed in the front side of the lever mount 12. The at least one lever 126 is radially formed on and protrudes from the periphery of the lever mount 12 adjacent to the front side of the lever mount 12 to enable the lever mount 12 to rotate relative to the clutch cam 11.

Figure 4:
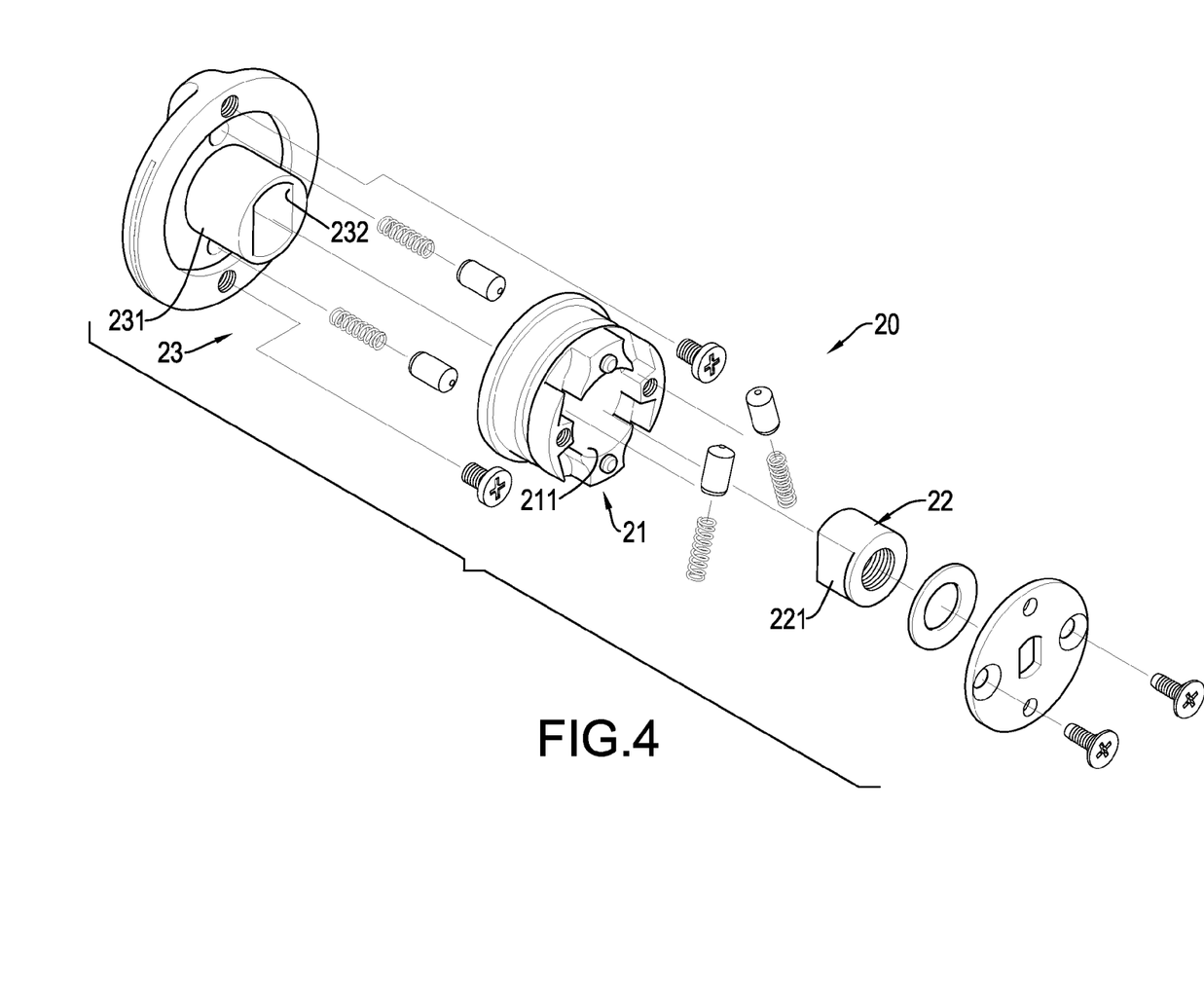
FIG. 4 is another enlarged and exploded perspective view of the fishing reel with the brake-adjusting assembly in FIG. 2.

With reference to FIGS. 2, 4 and 6, the second brake-adjusting device 20 is connected to the first brake-adjusting device 10 and the spindle 44 of the spool 40 to hold the first brake-adjusting device 10 on the mounting jacket 41 of the spool 40 and has a connecting mount 21, a threaded tube 22 and an adjusting switch 23.

The connecting mount 21 is rotatably mounted in the mounting recess 124 of the lever mount 12 around the spindle 44 and has a center and a through hole 211. The through hole 211 is formed through the center of the connecting mount 21 to enable the spindle 44 to extend through the connecting mount 21. In addition, the connecting mount 21 has a holding board mounted on a rear side of the connecting mount 21 and facing and abutting with the lever mount 12. Furthermore, a positioning device is mounted between the connecting mount 21 and the lever mount 12 to provide a positioning effect to the lever mount 12 when the lever mount 12 rotates relative to the connecting mount 12. The positioning device may be a prior art, description thereof is omitted and is shown in FIGS. 2 and 4.

The threaded tube 22 is mounted in the through hole 211 of the connecting mount 21, abuts with the holding board of the connecting mount 21 to enable the lever mount 12 to abut with the clutch cam 11, is screwed with the connecting end of the spindle 44 to hold the connecting mount 21 and the lever mount 12 around the spindle 44 and has an external surface and two locating faces 221. The locating faces 221 are formed on the external surface of the threaded tube 22 and are parallel to each other.

The adjusting switch 23 is securely connected to the connecting mount 21 and has a rear side and a driving tube 231. The driving tube 231 is axially formed on and protrudes from the rear side of the adjusting switch 23, extends in the through hole 211 of the connecting mount 21 and is securely mounted around the threaded tube 22. The driving tube 231 has an internal surface and two engaging faces 232. The engaging faces 232 are formed in the internal surface of the driving tube 231 and respectively engage the locating faces 221 of the threaded tube 22 to enable the threaded tube 22 to rotate with the adjusting switch 23 relative to the connecting mount 21. In addition, another positioning device is mounted between the connecting mount 21 and the adjusting switch 23 to provide a positioning effect to the adjusting switch 23 when the adjusting switch 23 rotates relative to the connecting mount 12. The positioning device may be a prior art, description thereof is omitted and is shown in FIGS. 2, 4 and 6.

According to the above-mentioned features of the brake-adjusting assembly in accordance with the present invention for the spool 40 of the fishing reel, the brake-adjusting assembly can provide a two-stage adjusting effect to the fishing reel to enable the fishing reel to have different friction forces. Then, the user can adjust the spool 40 with different friction forces according to the user's needs. With reference to FIGS. 1, 5 and 6, during fishing, the user can rotate the adjusting switch 23 relative to the connecting mount 21, and this can enable the threaded tube 22 to rotate with the adjusting switch 23. When the threaded tube 22 rotates with the adjusting switch 23, due to the threaded tube 22 being screwed with the connecting end of the spindle 44, the threaded tube 22 will move toward the lever mount 12 relative to the spindle 44. Then, the threaded tube 22 will push the holding board of the connecting mount 21 to move and to push the lever mount 12 to move inwardly along the spindle 44 by the pressing force of the threaded tube 22, and the lever mount 12 will push the clutch cam 11 to move inwardly to change the distances between the abutting disc 451, the brake disk 452 and the friction disk 453 of the brake 45. Therefore, the brake-adjusting assembly in accordance with the present invention can provide a first stage adjusting effect to the fishing reel by rotating the adjusting switch 23.

Figure 7:
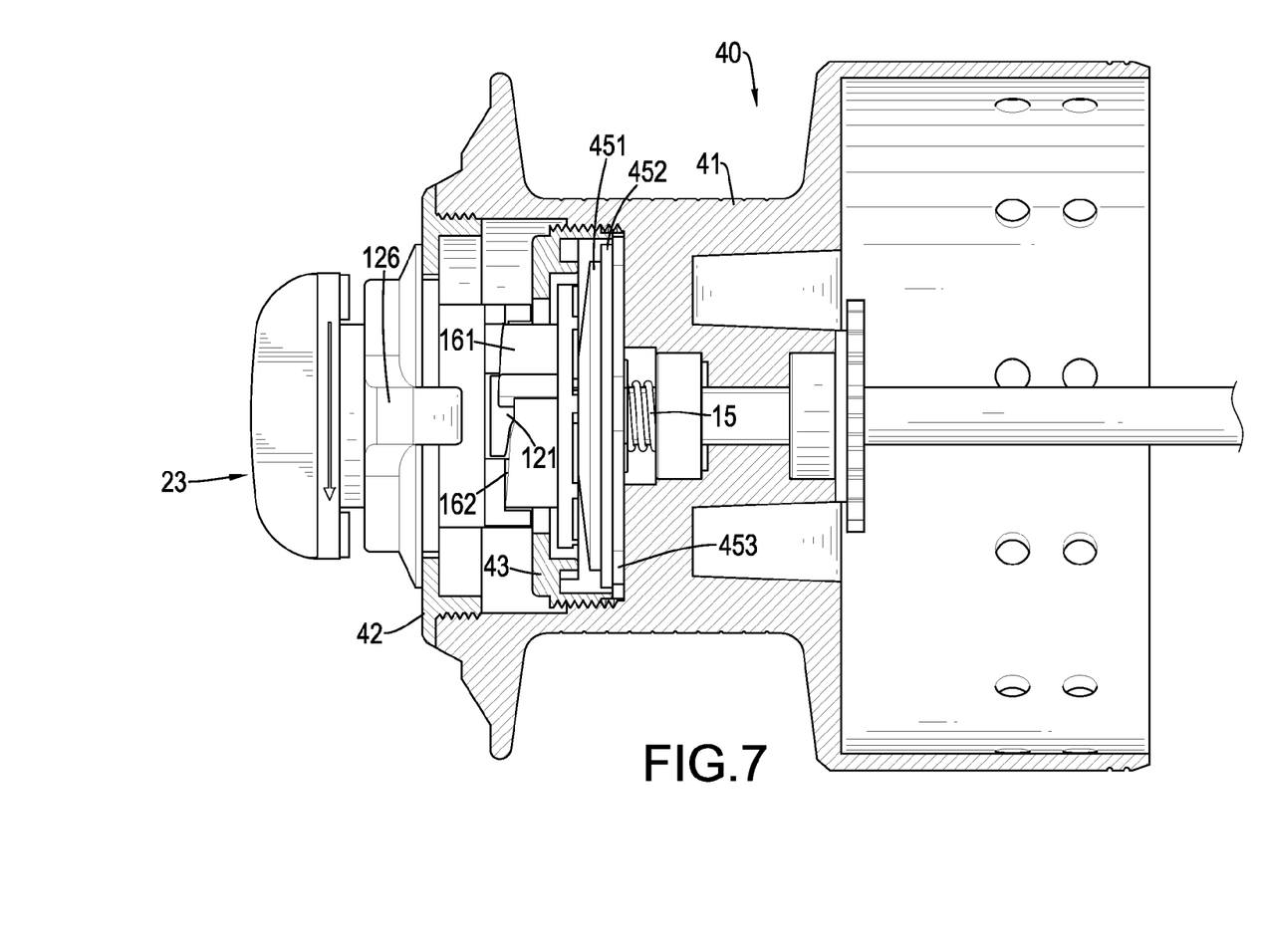
FIG. 7 is an operational side view in partial section of fishing reel with the brake-adjusting assembly in FIG. 1.
Figure 8:
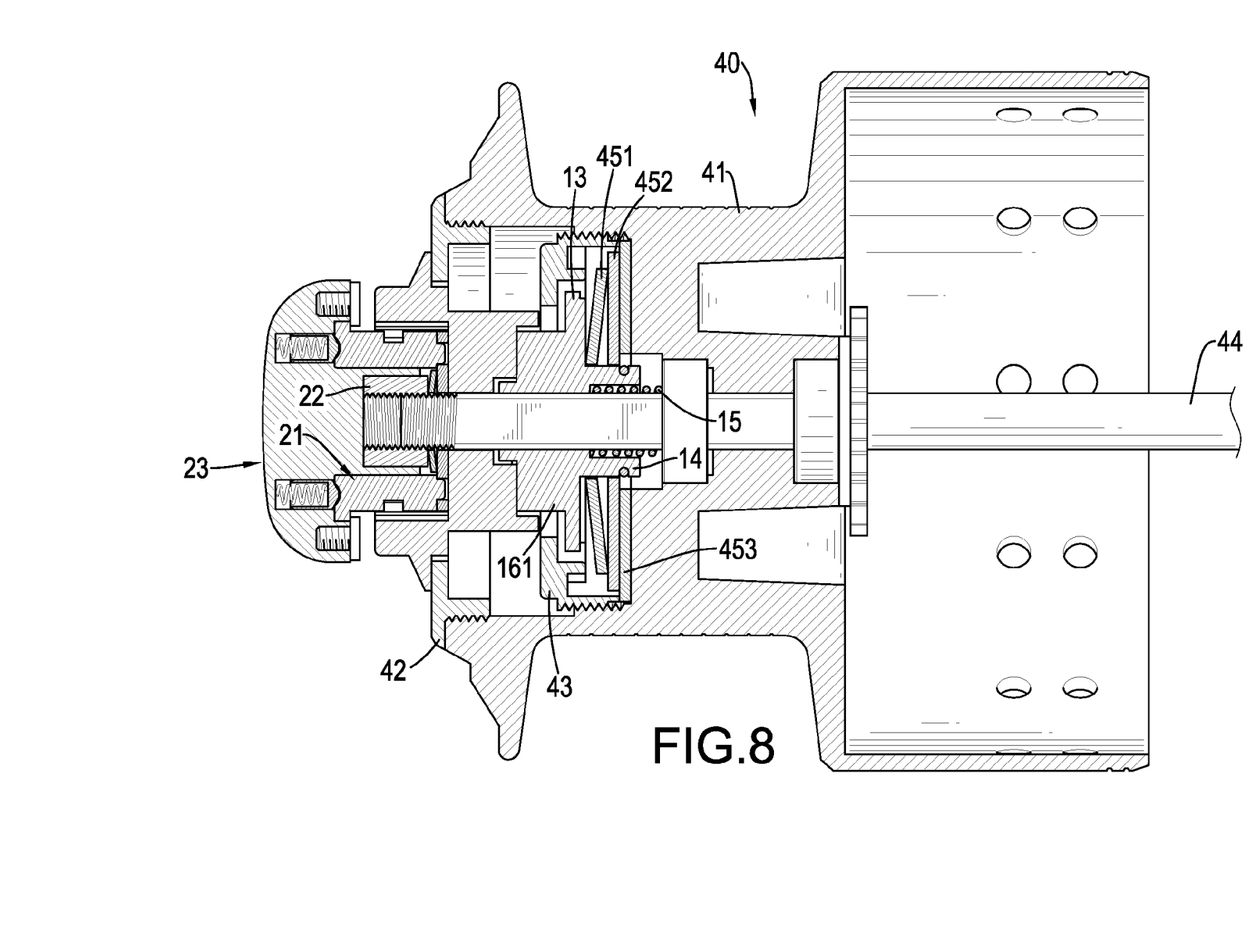
FIG. 8 is another operational side view in partial section of fishing reel with the brake-adjusting assembly in FIG. 1.

In addition, when the user catches a fish and needs to adjust the tension in the fishing line, with reference to FIGS. 3, 7 and 8, the user can turn the at least one lever 126 of the lever mount 12 by a little finger of one hand without separating the hands of the user from the fishing rod or the handle. Then, the lever mount 12 will rotate relative to the spool 40 to enable the pushing blocks 121 to rotate with the lever mount 12 and to enable the positioning protrusions 122 to move away the limiting protrusions 163. Due to the inclination of the abutting faces 162 of the abutting base 16, the pushing blocks 121 respectively abut against and push the abutting base 16 to move inwardly relative to the spindle 44. Then, the clutch cam 11 will be pushed to further move inwardly to change the distances between the abutting disc 451, the brake disk 452 and the friction disk 453 of the brake 45. Consequently, the brake-adjusting assembly in accordance with the present invention can provide a second stage adjusting effect to the fishing reel by turning the at least one lever 126 of the lever mount 12.

According to the above-mentioned statements, in use, the brake-adjusting assembly in accordance with the present invention for the fishing reel involves mounting the two brake-adjusting devices 10, 20 on the spool 40 to provide a two-stage adjusting effect to the fishing reel by rotating the adjusting switch 23 and turning the at least one lever 126 of the lever mount 12 conveniently. Then, the user can provide different friction forces to the spool 40 according to the user's need and can adjusting the friction force of the brake 45 quickly by a using a little finger without separating the hands from the fishing rod and the handle of the reel. Additionally, the brake-adjusting assembly for a fishing reel in accordance with the present invention can be assembled in different fishing reels and this will improve the practicality of the brake-adjusting assembly and will decrease the cost of maintaining and replacing the fishing reel.

What is claimed is:

1. A brake-adjusting assembly for a fishing reel with a spool having a mounting jacket with a front end, a cover detachably connected to the front end of the mounting jacket, a holding ring mounted in the mounting jacket and facing the cover, a spindle mounted in the mounting jacket, extending through the cover and the holding ring and having a connecting end extending out of the cover and a brake mounted around the spindle in the mounting jacket and facing the holding ring and having an abutting disc, a brake disk and a friction disk, and the brake-adjusting assembly comprising:
 a first brake-adjusting device being adapted to mount around the spindle of the spool in the mounting jacket and having:
  a clutch cam being adapted to movably forward or backward mount around the spindle between the holding ring and the brake and having:
   a main plate body being adapted to mount around the spindle between the holding ring and the brake, being adapted to selectively abut with the holding ring and the brake and having a front side and a rear side;
   a mounting tube formed on and protruding from the rear side of the main plate body, being adapted to mount around the spindle and to extend through the abutting disc, the brake disk and the friction disk of the brake;
   a spring being adapted to mount around the spindle, mounted in the mounting tube and abutting with the main plate body; and
   an abutting base formed on and protruding from the front side of the main plate body, being adapted to extend through the holding ring and to face the cover and being composed by two semicircular wedge blocks, and each wedge block having a front side and an abutting face obliquely formed on the front side of the wedge block; and
  a lever mount being adapted to rotatably mount around the spindle, abutting with the clutch cam and being adapted to extend out of the mounting jacket via the cover, and having:
   a rear side facing the abutting faces of the wedge blocks;
   a front side being adapted to extend out of the mounting jacket via the cover;
   a periphery;
   two pushing blocks formed on and protruding from the rear side of the lever mount and respectively abutting with the abutting faces of the wedge blocks;
   a mounting recess formed in the front side of the lever mount; and
   at least one lever radially formed on and protruding from the periphery of the lever mount adjacent to the front side of the lever mount to enable the lever mount to rotate relative to the clutch cam; and
 a second brake-adjusting device connected to the first brake-adjusting device, being adapted to connect to the spindle of the spool to hold the first brake-adjusting device on the mounting jacket of the spool and having:
  a connecting mount rotatably mounted in the mounting recess of the lever mount to mount around the spindle, abutting with the lever mount and having a center and a through hole formed through the center of the connecting mount to enable the spindle to extend through the connecting mount;
  a threaded tube mounted in the through hole of the connecting mount to screw with the connecting end of the spindle to hold the connecting mount and the lever mount around the spindle and abutting with the connecting mount to enable the lever mount to abut with the clutch cam; and
  an adjusting switch securely connected to the connecting mount and having a rear side and a driving tube axially formed on and protruding from the rear side of the adjusting switch, extending in the through hole of the connecting mount and securely mounted around the threaded tube.

2. The brake-adjusting assembly for a fishing reel as claimed in claim 1, wherein the main plate body has a diameter and the abutting base has a diameter smaller than the diameter of the main plate body to enable the abutting base to extend to the cover via the holding ring.

3. The brake-adjusting assembly for a fishing reel as claimed in claim 2, wherein
 each wedge block of the abutting base has a periphery and a limiting protrusion longitudinally formed on and protruding from the periphery of the wedge block;
 each pushing block of the lever mount has an outer surface; and
 the lever mount has two positioning protrusions respectively and longitudinally formed on and protruding from the outer surfaces of the pushing blocks and respectively and selectively abutting with the limiting protrusions of the wedge blocks.

4. The brake-adjusting assembly for a fishing reel as claimed in claim 3, wherein
 the threaded tube has an external surface and two locating faces formed on the external surface of the threaded tube and being parallel to each other; and
 the driving tube has an internal surface and two engaging faces formed in the internal surface of the driving tube and respectively engaging the locating faces of the threaded tube to enable the threaded tube to rotate with the adjusting switch relative to the connecting mount.

5. The brake-adjusting assembly for a fishing reel as claimed in claim 1, wherein
 the threaded tube has an external surface and two locating faces formed on the external surface of the threaded tube and paralleling each other; and
 the driving tube has an internal surface and two engaging faces formed in the internal surface of the driving tube and respectively engaging the locating faces of the threaded tube to enable the threaded tube to rotate with the adjusting switch relative to the connecting mount.

6. The brake-adjusting assembly for a fishing reel as claimed in claim 1, wherein
 each wedge block of the abutting base has a periphery and a limiting protrusion longitudinally formed on and protruding from the periphery of the wedge block;

each pushing block of the lever mount has an outer surface; and the lever mount has two positioning protrusions respectively and longitudinally formed on and protruding from the outer surfaces of the pushing blocks and respectively and selectively abutting with the limiting protrusions of the wedge blocks.

7. The brake-adjusting assembly for a fishing reel as claimed in claim 6, wherein the threaded tube has an external surface and two locating faces formed on the external surface of the threaded tube and paralleling each other; and the driving tube has an internal surface and two engaging faces formed in the internal surface of the driving tube and respectively engaging the locating faces of the threaded tube to enable the threaded tube to rotate with the adjusting switch relative to the connecting mount.

* * * * *